United States Patent
Kawabata et al.

(10) Patent No.: US 6,514,145 B1
(45) Date of Patent: Feb. 4, 2003

(54) HEIGHT ADJUSTABLE GAME MACHINE

(75) Inventors: Masaki Kawabata, Tokyo (JP); Kimio Tsuda, Tokyo (JP)

(73) Assignee: Kabushiki Kaisha Sega, Tokyo (JP)

( * ) Notice: Subject to any disclaimer, the term of this patent is extended or adjusted under 35 U.S.C. 154(b) by 0 days.

(21) Appl. No.: 09/787,352

(22) PCT Filed: Sep. 6, 1999

(86) PCT No.: PCT/JP99/05051
§ 371 (c)(1),
(2), (4) Date: Jul. 10, 2001

(87) PCT Pub. No.: WO00/15315
PCT Pub. Date: Mar. 23, 2000

(30) Foreign Application Priority Data

Sep. 16, 1998 (JP) .......................................... 10-262147

(51) Int. Cl.⁷ .......................... A63F 13/08; G07F 17/34
(52) U.S. Cl. ...................... 463/46; 463/20; 273/143 R; 273/309
(58) Field of Search ................ 463/46, 20, 47; 273/309, 143 R, 148 B, 121 B, 138.2

(56) References Cited

U.S. PATENT DOCUMENTS 5,513,846 A * 5/1996 Niederlein et al. ..... 273/143 R

FOREIGN PATENT DOCUMENTS

| JP | 61-103187 | 7/1986 |
|---|---|---|
| JP | 4-41898 | 10/1992 |
| JP | 9-299547 | 11/1997 |
| JP | 10-33828 | 2/1998 |
| JP | 2576788 | 5/1998 |
| JP | 10-216356 | 8/1998 |

* cited by examiner

Primary Examiner—Benjamin H. Layno
(74) Attorney, Agent, or Firm—Finnegan, Henderson, Farabow, Garrett & Dunner, L.L.P.

(57) ABSTRACT

A height adjustable game machine having a structure that can be easily adapted to a stand-up-type and a sit-down-type depending on situations. Each of a game controller, a game operation panel and a monitor is set as a unit. A base unit 2 accommodating the controller 3, the game operation unit 5 and the monitor unit 9 are held between opposed columns 4 in this order from the bottom. As a result, the height of the machine can be altered merely by changing the length of the columns 4, and it is possible to structure the game machine as a stand-up-type for a standing player or a sit-down-type for a seated player.

25 Claims, 7 Drawing Sheets

Fig. 9

HEIGHT ADJUSTABLE GAME MACHINE

TECHNICAL FIELD

The present invention relates to a game machine installed in arcades and game facilities, particularly to a game machine which comprises a monitor for displaying a game screen and the game is proceeded as a player operates buttons or levers.

BACKGROUND ART

The game machines with monitors installed in game facilities and arcades are mainly divided into the game machines which a standing player operates the input devices such as buttons and levers ("stand-up-type game machine"), and the game machines which a seated player operates the input devices ("sit-down-type game machine").

Figure 9:
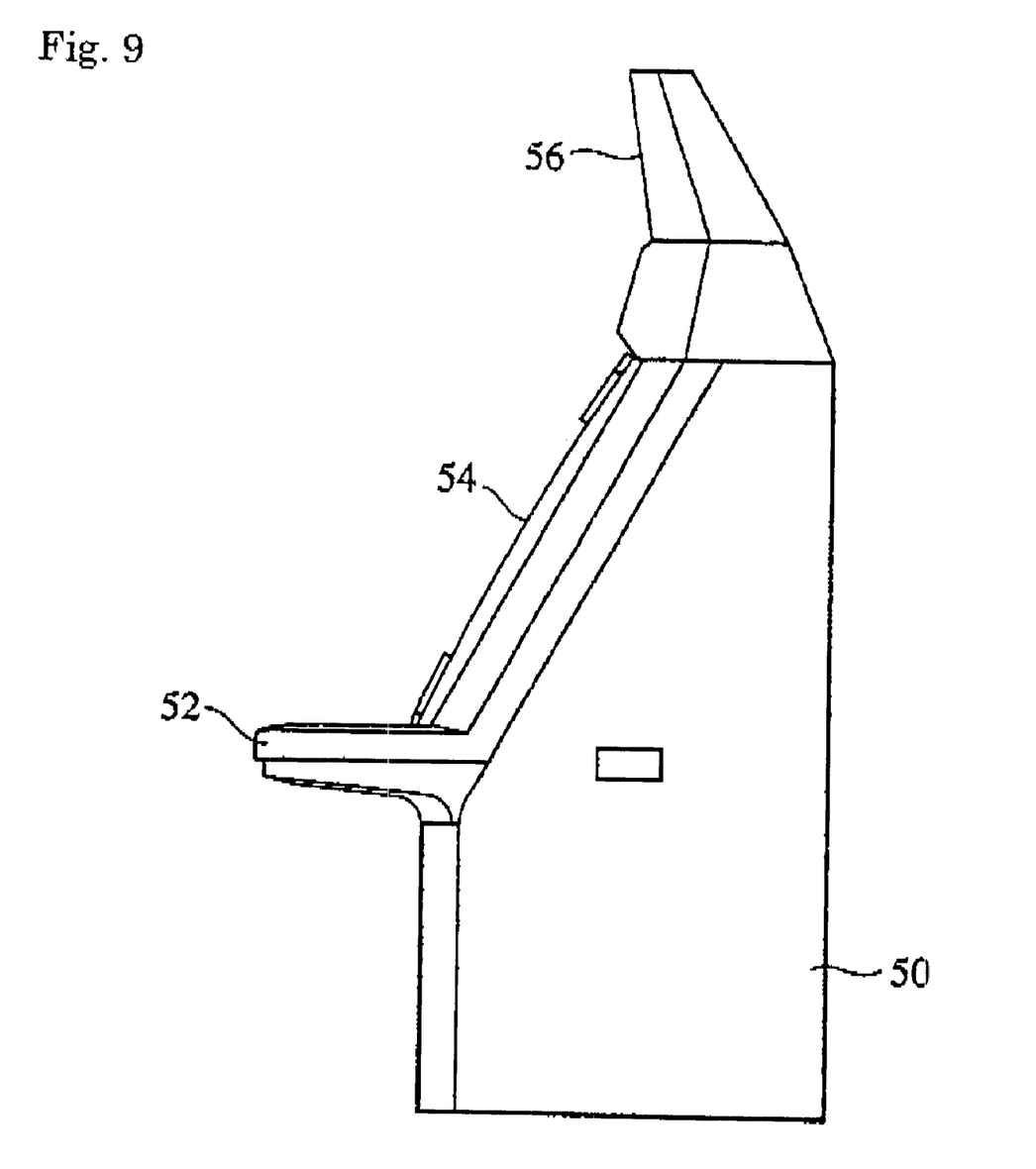
FIG. 9 is a side view of the conventional game machine.

FIG. 9 shows an example of a conventional sit-down-type game machine. A console 52 is provided at the front part of a box-shaped body 50, a monitor 54 is mounted above the console 52, and a decorative plate 56 is mounted above the monitor 54. A conventional stand-up-type game machine employs a higher body than the body 50 of the sit-down-type game machine in FIG. 9 so that the height of the console 52 allows a standing player to easily operate the game machine.

When supplying a developed game as a game machine to a market, whether setting it as a stand-up-type game machine or a sit-down-type game machine is nowadays determined depending on the content of the game. For example, a shooting game using a gun-type input device tends to have a stand-up-type game machine considering the operational characteristic of the input device. On the contrary, the games which require much thinking and which take long hours to complete one game, such as a mah-jongg game and a poker game, tends to have a sit-down-type game machine considering the strain caused to the player's body.

On the other hand, which game is more desirable over the other is different among countries and districts because the national characters, customs, and surrounding environments of the arcades are different. For example, in Europe and the U.S., the majority of the game machines are the stand-up-type devices regardless of the content of the games. Therefore, it is required to manufacture two types of game machines for a same game depending on the shipping destination. Moreover, because of the differences in the size of the body for containing a monitor, each and separate assembly lines are necessary and the cost tends to be high as a whole.

The object of this invention is to provide a game machine where the height of the game machine can be adjusted so that it can be easily adapted to a stand-up-type game machine and a sit-down-type game machine depending on the situation.

DISCLOSURE OF THE INVENTION

The object can be achieved by a game machine which comprises a base, a standing member raised from the base, and a game operation member and a monitor retained above the base by the standing member. In this structure, the constituting elements necessary for a game machine are made into units as a base, game operation member, and monitor, and these are retained by the standing member. Therefore, the height of the whole machine can be altered by only changing the length of the standing member and it is possible to switch between the stand-up-type and sit-down-type depending on the situation. Moreover, it can be carried in compact units, therefore, it is preferable when shipping. Furthermore, it is preferable that the monitor is kept close to the game operation member by the standing member.

In the game machine described above, it is desirable that the game machine comprises a plurality of standing members and that the plurality of standing members are raised from at least both lateral edges of the base. Because of this structure, the light and compact standing member has the strength to bear practical uses.

Also, it is desirable that the width of the standing member is narrower than the length of the base and the monitor. Because of this structure, the standing member can be compact.

Moreover, it is desirable that the length of the standing member is determined such that the height of the game operation member allows a seated player to easily operate the game machine. Because of this structure, it is possible to alter the height of the game operation member to allow a standing player to easily operate the game machine, only by adjusting the standing member to make it longer or replacing the standing member with a longer member.

Furthermore, it is desirable that the length of the standing member is determined such that the height of the game operation member allows a standing player to easily operate the game machine. Because of this, it is possible to alter the position of the game operation member to allow a seated player to easily operate, only by adjusting the standing member to make it shorter or replacing the standing member with a shorter member.

And yet, it is desirable that the position of the game operation member can be adjusted by adjusting the length of the standing member. Because of this, it is possible to alter the position of the game operation member without exchanging any members.

Regarding the game machine described above, the game machine can be formed both as a machine having the height which allows the seated player to easily operate it, and as a machine having the height which allows the standing player to easily operate it.

Regarding the game machine described above, the standing member is constituted of a plurality of members that are slidably engaged, and the length of the standing member can be adjusted by changing the length of the slidably engaged part. Because of this, the length of the standing member can be adjusted easily.

The standing members are separated into a left and right part at least at its bottom most part, and there is a gap between the left and right part. Because of this structure, it is possible to prevent the player's feet or legs from interfering with the bottom most part of the standing member or with the base. Particularly, when the standing members are inclined rearward, it is possible to avoid the interference with the player's feet or legs by providing a gap between the right and left part at the bottom most part of the standing member.

Regarding the game machine described above, the base can be provided such that it protrudes rearward away from the standing members. Because of this, the center of gravity of the whole game machine becomes stable. Also, interference with the player's feet or legs can be avoided.

Moreover, it is desirable that the height of the base at the parts to which the standing members are fixed is higher than the height of the rear part of the base. Because of this, it is possible to fix the standing members with the base firmly, and make a compact base by lowering the height of the rear part of the base.

Regarding the game machine described above, the game operation member can be provided such that it protrudes forward away from the standing members. Because of this, the player can operate the game easily and the center of gravity of the whole game machine becomes stable.

Moreover, it is desirable that the monitor is provided such that it protrudes rearward away from the standing member. Because of this, the monitor is arranged not too close to the player but at a position that allows the player to easily see the monitor. And, when the width of the standing member is narrow, the monitor is provided such that it protrudes rearward so that it is arranged in the position which allows the player to easily see the monitor.

It is also desirable that the monitor has at least its left and right laterals supported by the standing members along the end portion of the front side of the monitor. Because of this, the monitor can be supported firmly. Moreover, because the standing members support the monitor along the end portion of the front side of the monitor, the angle of the monitor can be set at the angle which allows the player to easily see the monitor by having the standing members inclined with a predetermined angle.

It is desirable that the standing members are inclined rearward. It is also desirable that the inclination angle of the standing members is 20±5 degree inclined from the perpendicular for the plane on which the game machine is installed. Because of this, the well-balanced arrangement of units becomes possible and the easiness of operation by the player improves.

Regarding the game machine described above, the game machine can further comprise a bridging member extending horizontally above the monitor and a decorative unit provided on the bridging member above the monitor. Because of this, the game machine becomes conspicuous and the attraction of customers is heightened.

Regarding the game machine comprising the decorative unit, the decorative unit comprises a light emitting member for emitting a light and a reflection member for reflecting and radiating outside the light emitted from said light emitting member. Thereby, the game machine becomes conspicuous.

Furthermore, it is desirable that the reflectance of the light of the reflection member becomes higher as the distance from the light emitting member becomes greater. Because of this, it is possible to radiate the lights at almost the same intensity both from the parts far from and close to the light emitting member.

Moreover, in the figures, Numeral 1 is a game machine, 2 is a base unit, 3 is a game board, 4 is standing members (columns), 5 is a game operation unit, 6 is operational buttons, 7 is a coin insert opening, 8 is a coin shoot, 9 is a monitor unit, 10 is a bridging member, 11 is a fluorescent lamp, 12 is a decorative unit, 13 is a decorative laminated sheet, 14 is a top plate, 15 is an opening, 16 is an acrylic plate, 17 is a reflection plate, 18 is a decorative plate, 21 is a side plate, 22 is the front side of the unit, 40 is columns, 41 is a frame member, 42 is a plane plate, 43 is a bolt, 44 is an adjustment opening of the length, and 45 is casters.

BEST MODE FOR CARRYING OUT THE INVENTION

Figure 1:
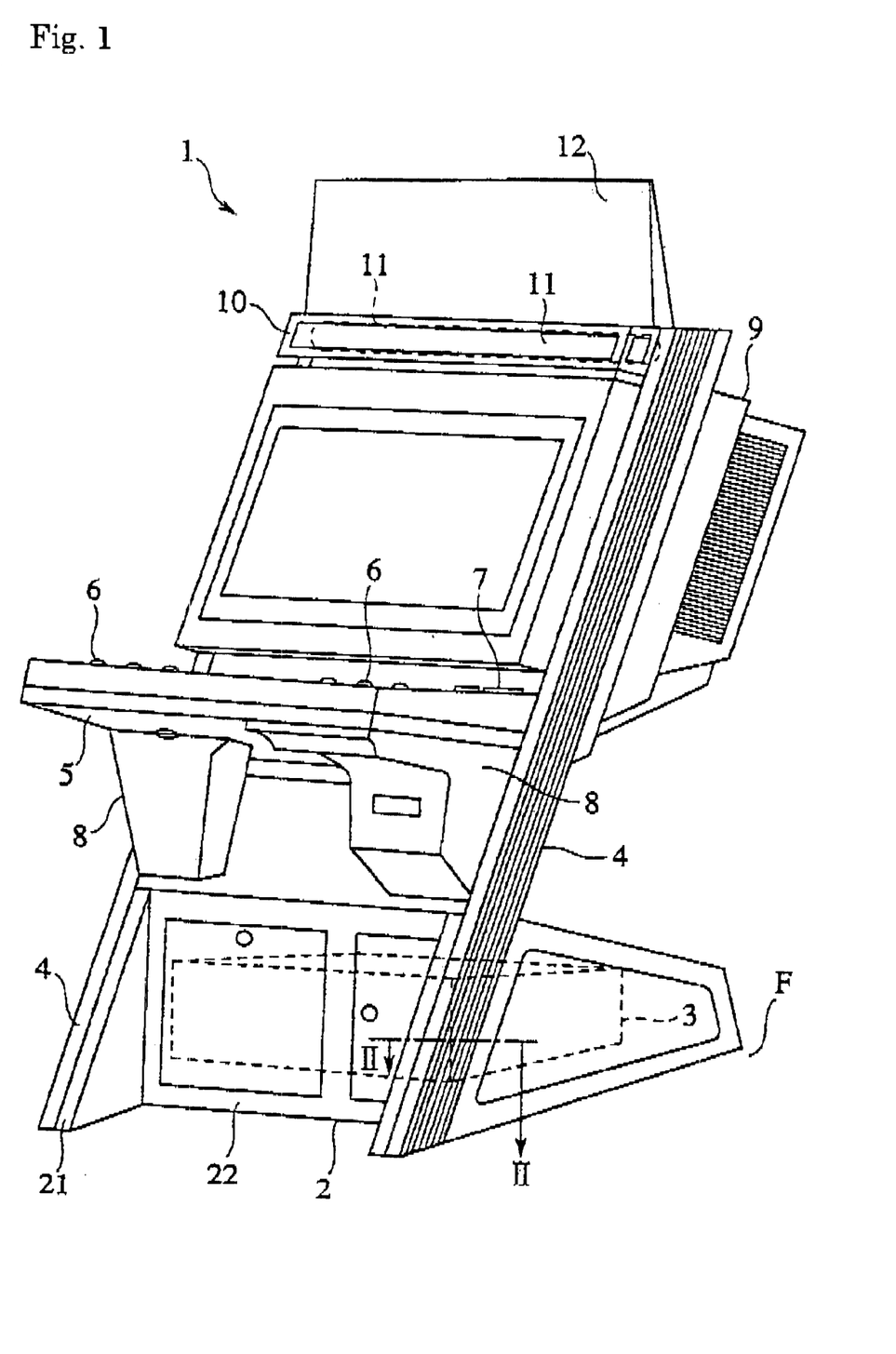
FIG. 1 is a perspective view of the basic structure of the game machine according to an embodiment of the present invention.

The game machine according to an embodiment of the present invention is hereinafter explained with reference to the figures. FIG. 1 is an appearance of the game machine according to an embodiment of the present invention.

The game machine 1 comprises, as a base, a base unit 2 which is the base located on a floor surface F of an arcade etc., as shown in FIG. 1. A game board 3 for controlling the operation of the game machine 1 is contained inside the base unit 2. The columns 4, that is, two standing members extending straight in the longitudinal direction are attached to both front laterals of the base unit 2, the columns being inclined rearward to the floor surface F.

Figure 2:
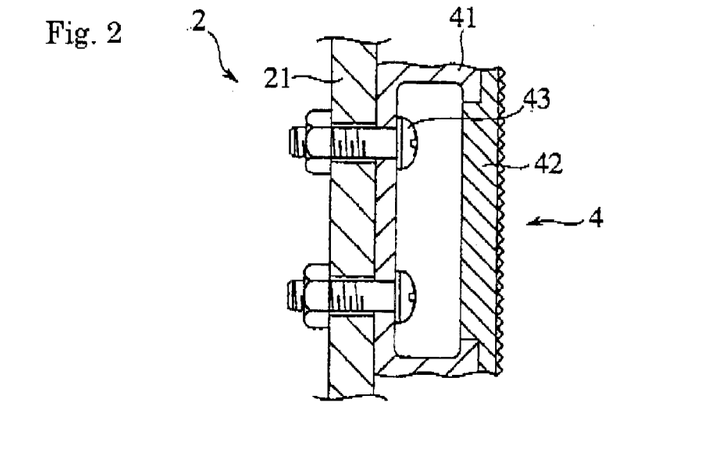
FIG. 2 is a sectional view of the columns and the base unit, sectioned by the line II—II in FIG. 1.

As shown in FIG. 2, in order to make it light and to secure enough strength, column 4 is constituted of a frame member 41 having a section in the shape of a "U" or of the Japanese letter "コ", and a long and slender plane plate 42 for closing the opening. The shape of the Japanese letter "コ" is simply a quadrilateral such as a rectangle having one side out of four removed. These columns 4 are set long and slender to make them compact, and the width of the columns 4 is narrower than the length of the base unit 2 or the length of a monitor unit 9 which is described later. The columns 4 are fixed via a bolt 43 to a side plate 21.

Moreover, the base unit 2 and the columns 4 are united such that the front side 22 of the base unit 2 does not protrude forward away from the columns 4 as shown in FIG. 1. This is to prevent the front portion of the base unit from protruding and interfering with the player's feet or legs, in the case of forming the game machine 1 as a sit-down-type game machine.

The front portion, which is the attachment side of the columns 4, of the base unit 2 is high and the top side of the base unit 2 inclines so that the rear portion, which is the opposite side of the attachment side of the column 4, is low. Because of this structure, the linking part of the columns with the base unit 2 is long and thereby the linkage is strengthened, while the volume of the base unit 2 is small and compact.

A game operation unit 5, a unit-style game operation panel is retained above the base unit 2 by the confronting columns 4. The game operation unit 5 is provided with a plurality of operational buttons 6 and a coin insert opening 7 on its top side, and it constitutes the player operation member of the game machine 1. A coin shoot 8 for discriminating the coins inserted by the player is united to the game operation unit under its bottom side. The coins discriminated by the coin shoot 8 are lead to the base unit 2 via a coin path of the columns 4.

A cable (not shown in the figures) runs through the columns 4, connecting the base unit 2, the game operation unit 5 and the monitor unit 9. The cable is necessary to connect the units that are divided separately, however, by letting the cable run through the columns 4, the cable is not exposed to the outside to become an obstacle, and it does not spoil the neat design.

A monitor unit 9 is provided closely above the game operation unit 5. The monitor unit 9 displays a game image by a monitor-driving signal output from the game board 3. The monitor unit 9 is fixed to the columns 4 by a fixing means such as a bolt.

More specifically, the monitor unit 9 is fixed in a manner that it protrudes rearward away from the columns 4. Because of this structure, the monitor unit in this embodiment can be arranged not too close to the player but at a position which allows the player to easily see the monitor. Particularly in this embodiment, the width of the columns 4 is narrow and the game operation unit 5 protrudes forward and the monitor unit 9 protrudes rearward, thereby, both units can be supported by the columns 4 and it can be achieved that the player can easily operate the unit and see the monitor.

The monitor unit 9 has its right and left sides supported by the two columns 4 along the end portion of the front side of the monitor unit 9. Because of this structure, the monitor unit 9 can be supported firmly.

And yet, in this embodiment, the game operation unit 5 and the monitor unit 9 are respectively structured as a separate unit, the game operation unit 5 is also fixed to the columns 4 by the fixing means such as a bolt etc. However, without limitation to the above structure, the game operation unit 5 and the monitor unit 9 can be united.

A bridging member 10 for connecting the confronting two columns 4 laterally is provided above the monitor unit 9. As the other units, this bridging member 10 is fixed to the top ends of the columns 4 by a bolt (not shown) etc.

Because of this structure, the game operation unit 5 and the monitor unit 9, that become an interface with the player, are arranged in a closed frame formed by the right and left columns 4, the base unit 2, and the bridging member 10, and they are supported by the columns stably.

Inside the bridging member 10, a fluorescent lamp 11 for illuminating the member from within is contained. Above the fluorescent lamp 11 a decorative unit 12 is attached, which has the name of the machine or game, logos, or illustrations pictured thereon.

Figure 3:
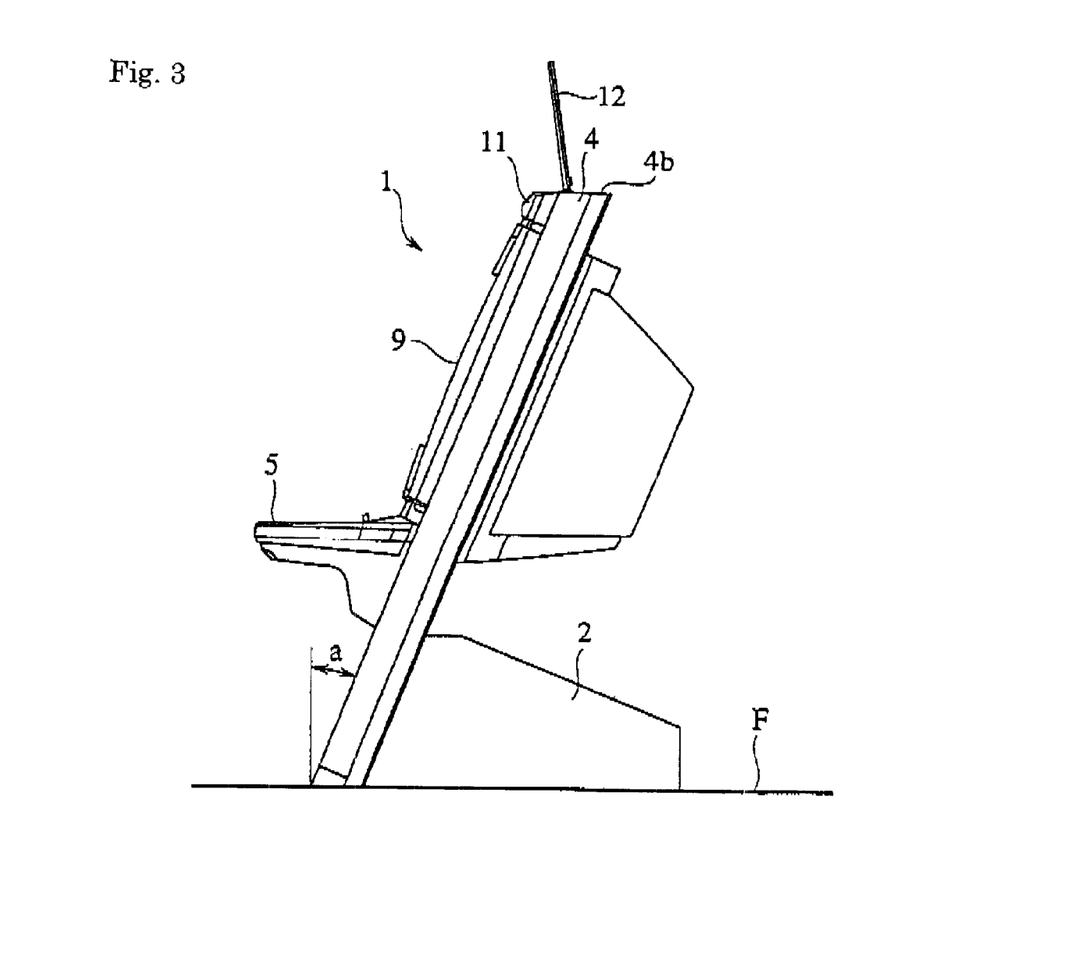
FIG. 3 is a side view of the game machine in FIG. 1.

FIG. 3 is the side view of the game machine 1 of the present embodiment. As it is clear in this figure, the columns 4 are attached to the base unit 2 as they incline from the bottom end 4a to the top end 4b, that is, from the front side of the game machine, which is on the left side of the figure, to the back side, which is on the right side of the figure. It is preferable that the inclination angle is 20±5 degrees inclined from the perpendicular for the floor surface F on which the base unit 2 is placed, in the interest of securing easiness in operating and seeing the monitor screen. Within this range, it is possible to arrange the operation panel in such position with such angle that allow the player to easily operate the game machine, and also it is possible to arrange the monitor screen in the position which allows the player to easily see the monitor, regardless of whether the machine is structured as a sit-down-type or as a stand-up-type.

As it is clear in FIG. 1, each body of the base unit 2 and the monitor unit 9 is provided such that it extends rearward away from the columns 4 that are inclined rearward obliquely. On the contrary, the game operation unit 5 having a relatively light weight is provided such that it protrudes forward away from the columns 4. Thereby, in the present invention, together with the angle setting of the standing members, it is possible to arrange the image display screen of the monitor unit 9 at a position which allows the player to easily see the monitor, and to arrange the game operation unit 5 at a position which allows the player to easily operate the game machine.

Moreover, in the present invention, the game machine 1 has a stable base by arranging the game board 3, which weights the most in the game machine, inside the base unit 2. Because of the arrangement of the monitor unit 9, the center of gravity of the game machine 1 is situated above the base unit 2, and the game machine 1 is located on the floor surface F in a stable manner.

Figure 4:
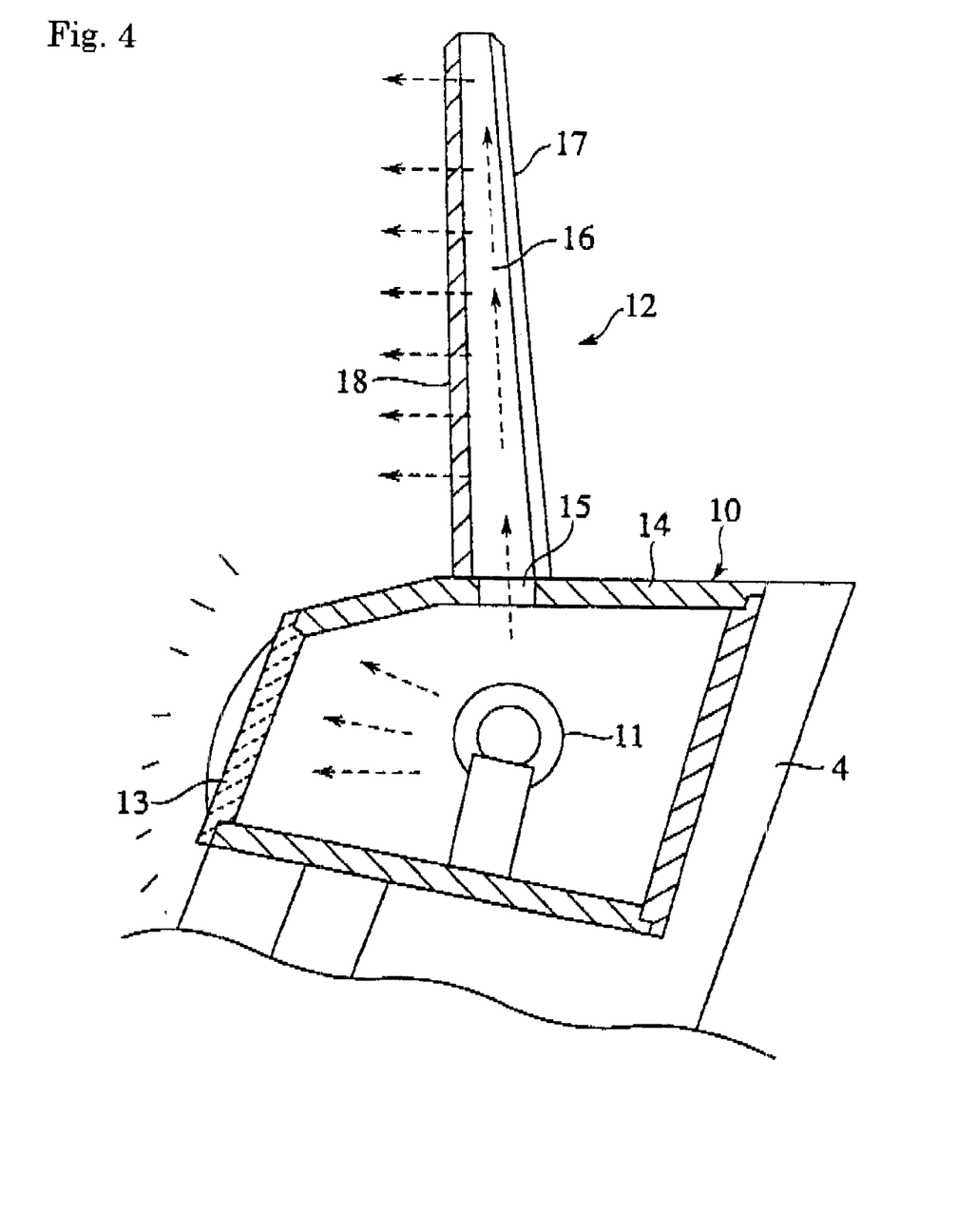
FIG. 4 is a sectional view of the upper part of the game machine in FIG. 1.

FIG. 4 is a sectional view seen from the same direction as FIG. 3, of the bridging member 10 and the decorative unit 12 that are located on the top part of the game machine. The bridging member 10 is formed as a hollow body and comprises the fluorescent lamp 11, which is a light emitting member. The fluorescent lamp 11 does not only brighten the decorative laminated sheet 13 arranged in front of the bridging member by lighting it from behind, but also emits the light via an opening 15 provided on the top plate and functions to brighten the decorative unit 12.

The decorative unit 12 is structured such that a light-introducing acrylic plate 16 is retained from both sides by the reflection plate 17 and the decorative plate 18. An upward light from the fluorescent lamp 11 is radiated forward by the reflection plate 17 and brightens the decorative plate 18 from behind.

All over one side of the reflection plate 17, dots having reflex action (not shown in the figure) are printed. The density of the dots is high on the part farther away from the fluorescent lamp 11, on the contrary, the part closer to the fluorescent lamp is printed with the dots in a manner that the density becomes low. Because the light attenuates as the distance from the fluorescent lamp 11 becomes wider, the light reaching the part farther away from the fluorescent lamp 11 is weak, and the light reaching the closer part of the lamp is strong. Therefore, the reflectivity toward the decorative plate 18 is high at the part farther away from the fluorescent lamp, and the reflectivity is low at the part closer to the fluorescent lamp, thereby, almost uniform light can be reflected toward the decorative plate 18.

On the surface of the decorative plate 18, the name of the machine or game, logos, or illustrations are pictured. Because of this, and by the light emitting decorative unit 12, the game machine 1 can become conspicuous.

Next, the relationship between the game machine 1 and the player in this embodiment is hereinafter explained with reference to FIG. 5 and FIG. 6.

Figure 5:
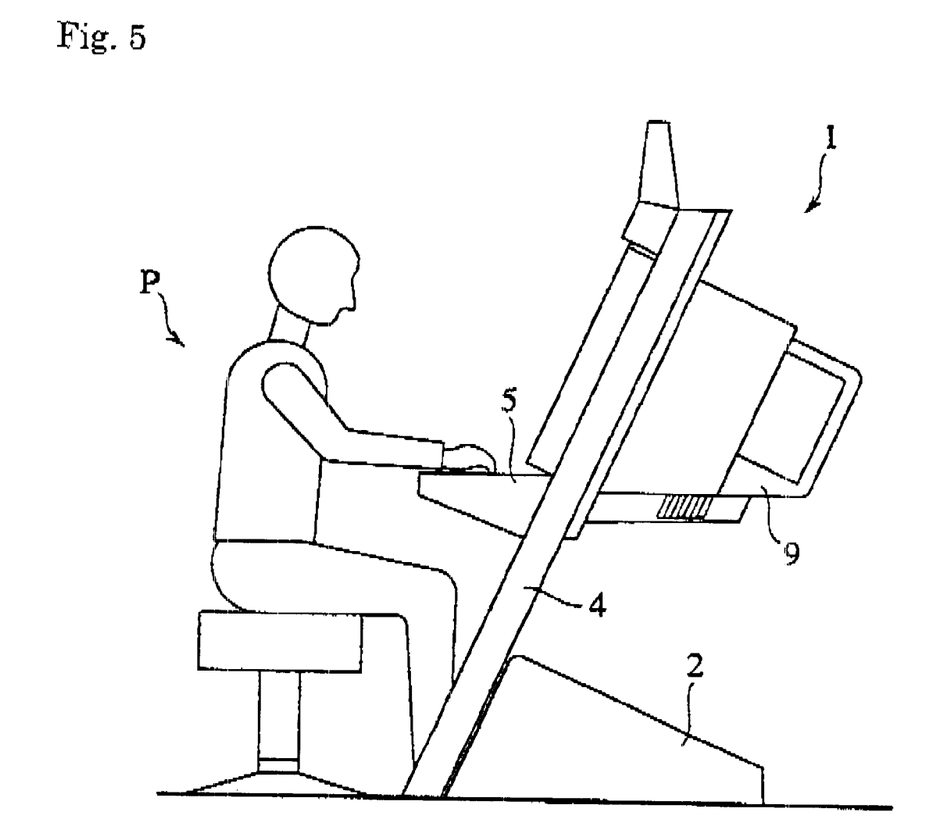
FIG. 5 indicates a usage example of the game machine according to an embodiment of the present invention.
Figure 6:
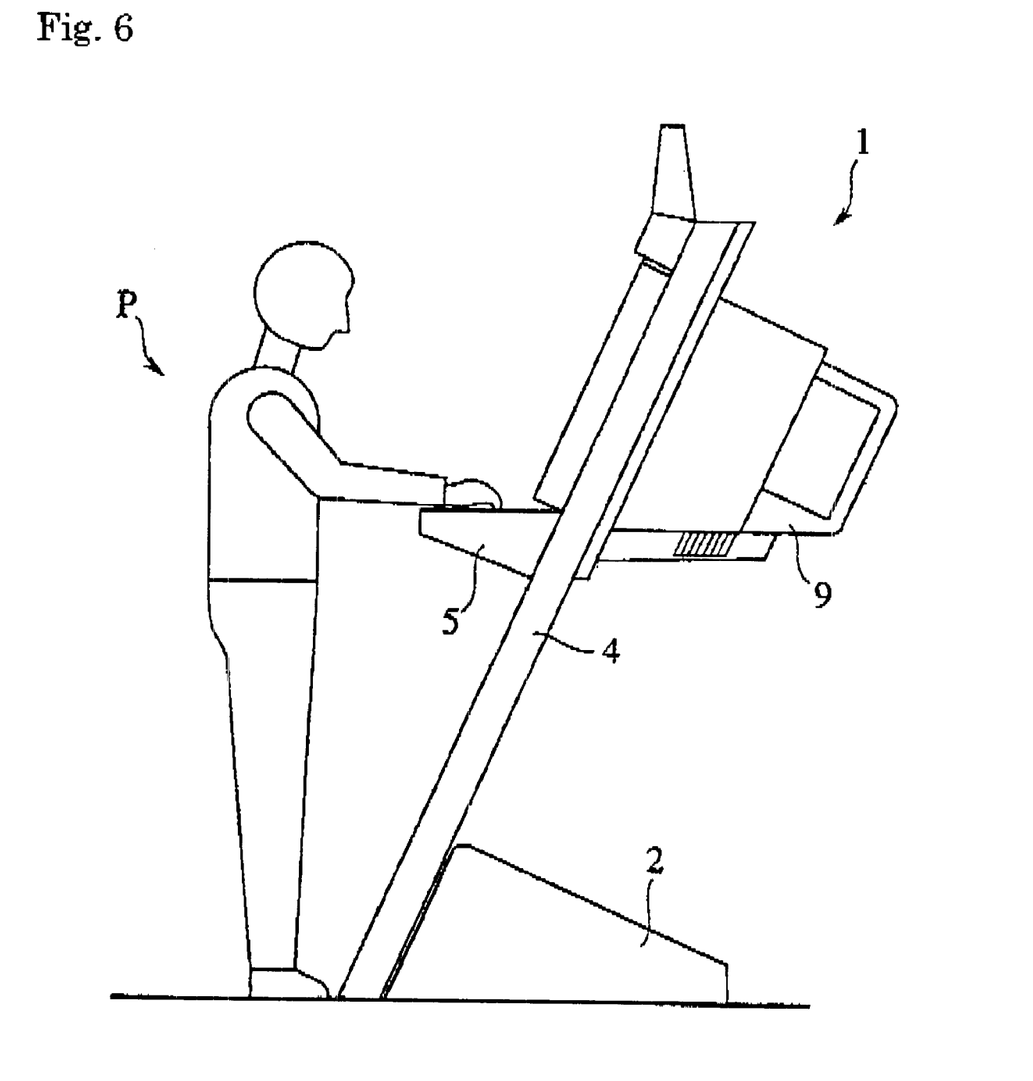
FIG. 6 indicates a different usage example of the game machine according to an embodiment of the present invention.

FIG. 5 indicates the situation of the player P and what is called a sit-down-type game machine 1 wherein the player is seated on a chair etc. On the contrary, FIG. 6 indicates the situation of the player P and a stand-up-type game machine 1 wherein the player plays the game while standing. The only difference between the game machines 1 shown in FIG. 5 and FIG. 6 is the length of the columns 4, and both machines have other structures in common.

In the game machine shown in FIG. 5, sufficient space for the seated player to put his/her feet or legs can be secured right under the game operation unit 5. In the game machine shown in FIG. 6, the base unit 2 protrudes right under the game operation unit 5 but the base unit 2 does not become an obstacle because the player is standing.

(The Advantageous Point of the Embodiment)

In this embodiment, the main body of the game control device, game operation panel and monitor, that are necessary for a game machine, are respectively set as a unit, and these are retained between the two columns 4, therefore, the height of the game machine 1 is determined by the length of the columns 4. Namely, because each of the constituting members such as the control device, operation panel and monitor is common to both the stand-up-type and the sit-down-type, and because the two types of columns 4 are used properly depending on the situation where the machine is carried to, even one manufacture line can deal with the production of the game machine 1 of the sit-down-type as well as stand-up-type and so the cost can be reduced.

Also in this embodiment, the game operation unit is attached to the columns raised obliquely from the base unit, and the monitor unit is provided on the base unit, therefore, the design of the game machine is simple, good-looking and compact. Only the height is different but the design is the same between the sit-down-type game machine and the stand-up-type game machine, so there is no incompatibility but a sense of uniformity if both machines are placed in a same game facility.

Moreover, the game machine 1 of the present embodiment does not have the structure as the conventional arcade type game machine in which the game controller and monitor are uniformly incorporated into a big body. Because of this structure, the game machine 1 can be shipped from a factory in kits before assembly and its compact size allows the reduction of the cost required for distribution and storage, which leads to great reduction in costs.

Furthermore, the game machine in the present embodiment has more space around the base part and the monitor part than the conventional game machine does as shown in FIG. 9. Therefore, the heat generated around the base and monitor parts easily escapes and it is possible to prevent the overheating of the machine.

The columns 4 of the game machine in the present embodiment are longitudinally straight having a section in the shape of a "U" or of the Japanese letter "コ", therefore, the columns 4 can be enough strength even if its width is narrow. The columns 4 also have an advantageous point that it is convenient in shipping because of they are longitudinally straight and the width is narrow. If shipment of the columns 4 is simple as described, the exchange of the columns 4 can be easily done at the place where the game machine is shipped, and a specification change can be easily performed at the local site.

(Modified example)

The present invention is not limited to the described embodiment, but can be variously modified.

Figure 7:
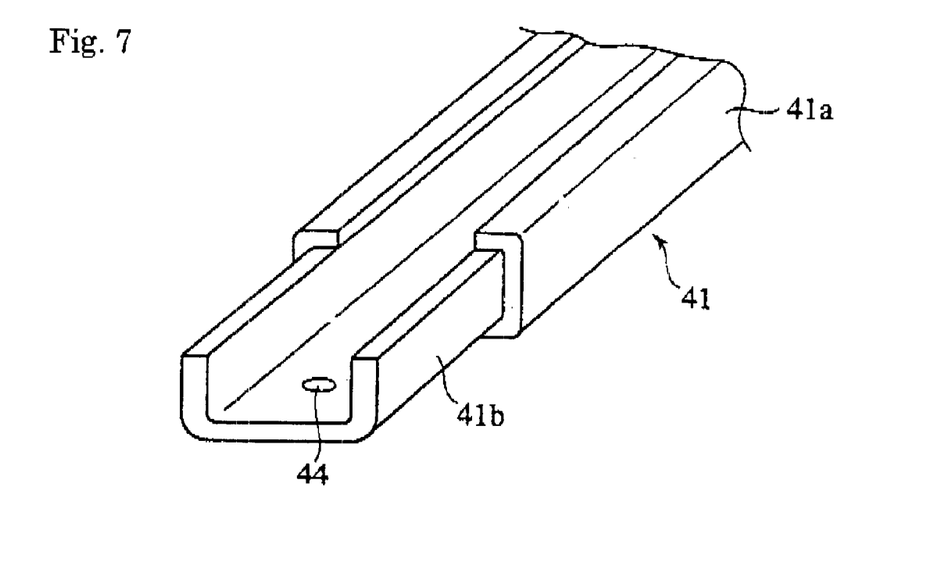
FIG. 7 is an appearance of the columns, which lengths can be changeable, constituting the game machine according to another embodiment of the present invention.

For example, regarding the structure of the columns, it is possible to construct the frame member 41 using two parts 41a and 41b that are slidably engaged. The length of the columns can be altered by changing the engaged length of the members 41a and 41b, that is, by engaging/disengaging the two members. Thereby, the height of the machine can correspond to both the sit-down-type game machine and the stand-up-type game machine without exchanging the materials.

The overall length of the columns can be adjusted in multiple levels by forming bolt openings 44 in the longitudinal direction of the columns as shown in FIG. 7. Or, it can be adjusted without limitations such as bolt openings, thereby the height of the game machine can be finely controlled depending on the situation.

Moreover, in the embodiment described above, the columns are structured by the frame member 41 having a section in the shape of an alphabet "U" or of a Japanese character "コ", but the frame member can be a simple plate or bar depending on how the columns are attached to each unit.

The standing members used in the game machine of the present invention can be structured by one member. However, in order to secure strength by one member, it has to be heavy and thick, therefore, the shipment cost for the standing members becomes large. It seems easy to secure structural strength when the standing members are two or more even if each of the members is relatively light and thin.

Figure 8:
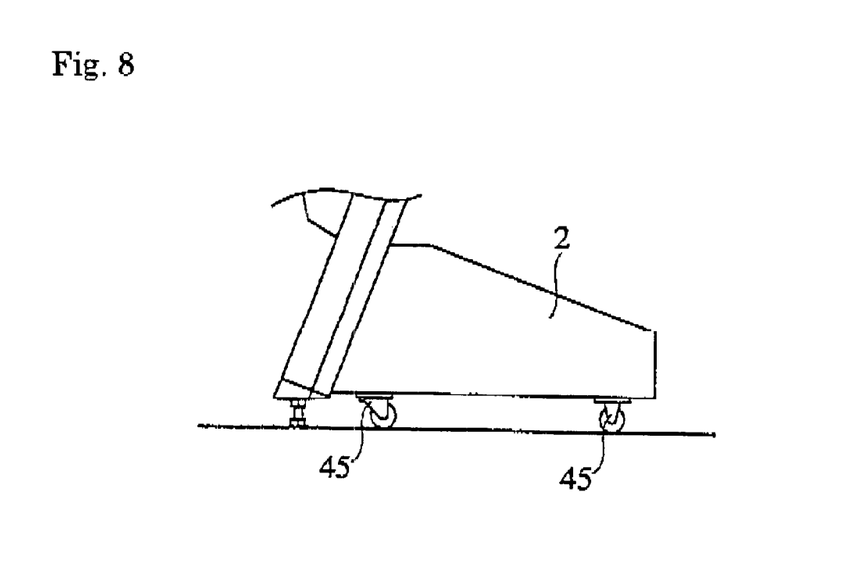
FIG. 8 indicates the bottom part of the game machine of the present invention, to which the casters of the game machine in the other embodiments are attached.

Furthermore, the game machine 1 of the described embodiment is what is called a ground placement type, that is, the base unit 2 is directly placed on the floor, however, it is possible to attach a plurality of casters 45 to the inferior surface of the base unit 2. Thereby, it is possible to move the machine when necessary even after the machine is assembled.

And yet, the decorative unit described above can be attached not only to the game machine of the above embodiment but also to the game machine of the other embodiments.

As explained, in the present invention, the constituting elements necessary for a game machine are set as units such as the base unit, game operation unit and monitor unit, and these are retained by the columns. Thereby, the height of the whole machine can be altered by only changing the length of the columns, and the machine can easily be adapted to a stand-up-type and a sit-down-type depending on the situation. Moreover, the machine can be carried in compact units, therefore, it is preferable when shipping.

What is claimed is:

1. A game machine comprising:
   a base;
   a game board for controlling the game machine wherein said game board is inside said base;
   a standing member raised from said base; and
   a game operation member and a monitor that are structured as separate units from said base and retained above said base by said standing member, wherein said standing member extends upward from said base through said game operation member and said monitor.

2. The game machine according to claim 1 comprising a plurality of said standing members, wherein said plurality of standing members are raised from at least both lateral edges of said base.

3. The game machine according to claim 2, wherein the width of said standing members is narrower than the length of said base and said monitor.

4. The game machine according to either one of claims 2 or 3, wherein the length of said standing members is determined such that the height of said game operation member allows a seated player to easily operate the game machine.

5. The game machine according to either one of claims 2 or 3, wherein the length of said standing members is determined such that the height of said game operation member allows standing player to easily operate the game machine.

6. The game machine according to either one of claims 2 or 3, wherein the position of said game operation member can be adjusted by adjusting the length of said standing members.

7. The game machine according to claim 6, wherein said standing members include a plurality of second members that are slidably engaged, and the length of said standing members can be adjusted by changing the length of a part where said plurality of second members are engaged.

8. The game machine according to either one of claims 2 or 3, wherein the game machine can be formed both as a machine having a height which allows a seated player to easily operate the game machine, and as a machine having a height which allows the standing player to easily operate the game machine, by adjusting the length of said standing members.

9. The game machine according to claim 8, wherein said standing members include a plurality of second members that are slidably engaged, and the length of said standing members can be adjusted by changing the length of a part where said plurality of second members are engaged.

10. The game machine according to either one of claims 2 or 3, wherein said standing members are separated into a left part and a right part at least at a bottom most part, and there is a gap between said left and right parts.

11. The game machine according to claim 10, wherein said standing members are inclined away from a player operation position.

12. The game machine according to claim 11, wherein an inclination angle of said standing members is 20±5 degrees inclined from the perpendicular for the plane on which said game machine is installed.

13. The game machine according to either one of claims 2 or 3, wherein said base is provided to protrude away from said standing members and away from a player operation position.

14. The game machine according to claim 13, wherein the height of said base at the part of which said standing members are fixed is higher than the height of the part of said base protruding away from said standing members and away from the player operation position.

15. The game machine according to claim 14, wherein said standing members are inclined away from the player operation position.

16. The game machine according to claim 13, wherein said standing members are inclined away from the player operation position.

17. The game machine according to either one of claims 2 or 3, wherein said game operation member is provided to protrude forward away from said standing members and toward a player operation position.

18. The game machine according to claim 17, wherein said standing members are inclined away from the player operation position.

19. The game according to either one of claims 2 or 3, wherein said monitor is provided to protrude away from said standing members and away from a player operation position.

20. The game machine according to claim 19, wherein said standing members are inclined away from the player operation position.

21. The game machine according to either one of claims 2 or 3, wherein at least left and right lateral portions of said monitor are supported by said standing members.

22. The game machine according to claim 21, wherein said standing members are inclined away from the player operation position.

23. The game machine according to either one of claims 2 or 3, further comprising:
  a bridging member; and
  a decorative unit provided on said bridging member.

24. A game machine comprising:
  a base;
  a game board for controlling the game machine wherein said game board is inside said base;
  a standing member raised from said base;
  a game operation member and a monitor that are structured as separate units from said base and retained above said base by said standing member, wherein said standing member extends upward from said base through said game operation member and said monitor; and
  a decorative unit, wherein said decorative unit comprises a light emitting member for emitting a light and a reflection member for reflecting and radiating outward the light emitted from said light emitting member.

25. A game machine according to claim 24, wherein a reflectance of the light of said reflection member becomes higher as a distance from said light emitting member becomes greater.

* * * * *